United States Patent
Li et al.

(10) Patent No.: US 11,139,879 B2
(45) Date of Patent: Oct. 5, 2021

(54) PRECODING DETERMINING METHOD AND DEVICE, ELECTRONIC DEVICE, AND STORAGE MEDIUM

(71) Applicant: XI'AN ZHONGXING NEW SOFTWARE CO., LTD., Shaanxi (CN)

(72) Inventors: Yong Li, Guangdong (CN); Zhaohua Lu, Guangdong (CN); Chuangxin Jiang, Guangdong (CN); Yijian Chen, Guangdong (CN); Yu Ngok Li, Guangdong (CN); Hao Wu, Guangdong (CN); Jianxing Cai, Guangdong (CN); Yuxin Wang, Guangdong (CN); Huahua Xiao, Guangdong (CN); Cong Zhou, Guangdong (CN)

(73) Assignee: XI'AN ZHONGXING NEW SOFTWARE CO., LTD.

(*) Notice: Subject to any disclaimer, the term of this patent is extended or adjusted under 35 U.S.C. 154(b) by 0 days.

(21) Appl. No.: 16/968,927

(22) PCT Filed: Jan. 30, 2019

(86) PCT No.: PCT/CN2019/073870
§ 371 (c)(1),
(2) Date: Aug. 11, 2020

(87) PCT Pub. No.: WO2019/154211
PCT Pub. Date: Aug. 15, 2019

(65) Prior Publication Data
US 2021/0021318 A1  Jan. 21, 2021

(30) Foreign Application Priority Data
Feb. 12, 2018 (CN) .......................... 201810146903.9

(51) Int. Cl.
H04B 7/02 (2018.01)
H04B 7/06 (2006.01)
H04L 5/00 (2006.01)

(52) U.S. Cl.
CPC .......... *H04B 7/0639* (2013.01); *H04B 7/066* (2013.01); *H04L 5/0005* (2013.01); *H04L 5/0048* (2013.01)

(58) Field of Classification Search
CPC ..... H04B 7/0639; H04B 7/066; H04L 5/0005; H04L 5/0048
(Continued)

(56) References Cited

U.S. PATENT DOCUMENTS

2012/0051257 A1* 3/2012 Kim .................... H04B 7/0617
370/252
2016/0173245 A1 6/2016 Sayana et al.
2017/0180194 A1 6/2017 Noh et al.

FOREIGN PATENT DOCUMENTS

CN 103347298 A 10/2013
CN 105991231 A 10/2016
(Continued)

OTHER PUBLICATIONS

English Translation of International Search Report dated Apr. 8, 2019; International Patent Application No. PCT/CN2019/073870 filed Jan. 30, 2019. ISA/CN.
(Continued)

*Primary Examiner* — Zewdu A Kassa
(74) *Attorney, Agent, or Firm* — McDonald Hopkins LLC

(57) ABSTRACT

Provided is a method for determining precoding. The method includes configuring, by a first communication node, configuration information for a second communication node; transmitting the configuration information to the second communication mode; and the configuration infor-
(Continued)

mation includes: first configuration information and second configuration information. Further provided is a device for determining precoding, an electronic device and a storage medium.

20 Claims, 3 Drawing Sheets

(58) Field of Classification Search
USPC ........ 375/267, 261, 260, 259, 219, 295, 316
See application file for complete search history.

(56) References Cited

FOREIGN PATENT DOCUMENTS

| | | |
|---|---|---|
| CN | 107370591 A | 11/2017 |
| CN | 107534540 A | 1/2018 |
| CN | 108259074 A | 7/2018 |
| WO | 2017146533 A1 | 8/2017 |

OTHER PUBLICATIONS

Chinese Office Action and search report dated Mar. 19, 2021; Chinese Patent Application No. 201810146903.9.

\* cited by examiner

PRECODING DETERMINING METHOD AND DEVICE, ELECTRONIC DEVICE, AND STORAGE MEDIUM

CROSS-REFERENCE TO RELATED APPLICATION

This application is a 35 U.S.C. 371 national stage filing of PCT Application No. PCT/CN2019/073870, filed on Jan. 30, 2019, which claims priority to Chinese patent application No. 201810146903.9 filed with CNIPA on Feb. 12, 2018, the disclosures of which are incorporated herein by reference in their entireties.

TECHNICAL FIELD

The present disclosure relates to the field of communications, and for example, to a method and device for determining precoding, an electronic device and a storage medium.

BACKGROUND

In the multi-antenna technology of the wireless communication technology, pre-coding is applied to a transmitting antenna to improve the performance of communication. Generally, a transmitting side transmits a reference signal (RS) on a resource, and a receiving side uses a reference signal to measure channel state information (CSI), and then feeds back precoding information. The precoding is usually fed back in a form of precoding matrix indicator (PMI). The precoding usually has a predefined form. The precoding is determined by parameters included in the precoding. The precoding or precoding matrix indicator is often fed back in a form of feeding back the precoding parameter information. The resource for transmitting the reference signal is a resource defined in a frequency domain and a time domain, and is a combination of a set of time-frequency resource units.

In the related art, the receiving side obtains all precoding information by measuring the reference signal transmitted on one resource; however, there are the following defects: when the number of antenna ports of the reference signal transmitted on a single resource is less than the number of antenna ports actually used, or less than the number of antenna ports required in a feedback report, the precoding cannot be measured.

For the problem in the related art that a possibility of incomplete precoding information acquired on the receiving side exists in the related art, no effective solution has been proposed yet.

SUMMARY

Embodiments of the present disclosure provide a method and device for determining precoding, an electronic device and a storage medium to at least solve the problem that a possibility of incomplete precoding information acquired on a receiving side exists in the related art.

According to an embodiment of the present disclosure, a method for determining precoding is provided. The method includes: configuring, by a first communication node, configuration information for a second communication node; and transmitting, by the first communication node, the configuration information to the second communication node, where the configuration information includes: first configuration information and second configuration information; where the first configuration information includes information of M or more resources, and the first configuration information is used for instructing the second communication node to receive, on the M or more resources, a reference signal sent by the first communication node; the second configuration information is used for indicating a manner in which the second communication node acquires the precoding based on combined measurement results of the M or more resources; and M is an integer greater than 1, and the M or more resources are located in a same resource setting.

According to another embodiment of the present disclosure, a method for determining precoding is further provided. The method includes: receiving, by a second communication node, configuration information transmitted by a first communication node, where the configuration information includes first configuration information and second configuration information; feeding back, by the second communication node, the precoding to the first communication node according to the configuration information; where the first configuration information includes information of M or more resources and the first configuration information is used for instructing the second communication node to receive, on the M or more resources, a reference signal sent by the first communication node; and the second configuration information is used for indicating a manner in which the second communication node acquires the precoding based on combined measurement results of the M or more resources; and M is an integer greater than 1, and the M or more resources are located in a same resource setting.

According to another embodiment of the present disclosure, a device for determining precoding is further provided. The device includes: a first determination module, configured to configure configuration information for a second communication node; and a first transmission module, configured to transmit the configuration information to the second communication node, where the configuration information includes: first configuration information and second configuration information; where the first configuration information includes information of M or more resources, and the first configuration information is used for instructing the second communication node to receive, on the M or more resources, a reference signal sent by the first transmission module; the second configuration information is used for indicating a manner in which the second communication node acquires the precoding based on combined measurement results of the M or more resources; and M is an integer greater than 1, and the M or more resources are located in a same resource setting.

According to another embodiment of the present disclosure, a device for determining precoding is further provided. The device includes: a first receiving module, configured to receive configuration information transmitted by a first communication node, where the configuration information includes first configuration information and second configuration information; a feedback module, configured to feed back the precoding to the first communication node according to the configuration information; where the first configuration information includes information of M or more resources, and the first configuration information is used for instructing the second communication node to receive, on the M or more resources, a reference signal sent by the first communication node; the second configuration information is used for indicating a manner in which the feedback module acquires the precoding based on combined measurement results of the M or more resources; and M is an integer greater than 1, and the M or more resources are located in a same resource setting.

According to another embodiment of the present disclosure, a storage medium is further provided. The storage medium is configured to store computer programs, where the computer programs, when are executed, perform the method described in any embodiment described above.

According to another embodiment of the present disclosure, an electronic device is further provided. The electronic device includes a memory and a processor. The memory is configured to store computer programs, and the processor is configured to execute the computer programs for performing the method described in any embodiment described above.

BRIEF DESCRIPTION OF DRAWINGS

The drawings described herein are used to provide an understanding of the present application, and form a part of the present application. The exemplary embodiments and descriptions thereof in the present disclosure are used to explain the present disclosure and do not limit the present disclosure in any improper way. In the drawings.

DETAILED DESCRIPTION

The present disclosure will be described hereinafter in detail with reference to the drawings and in conjunction with embodiments. If not in collision, the embodiments described herein and the features thereof may be combined with each other.

The terms "first", "second" and the like in the specification, claims and above drawings of the present disclosure are used to distinguish between similar objects and are not necessarily used to describe a particular order or sequence.

Embodiment One

An embodiment of the present application provides a mobile communication network (which includes, but is not limited to, a 5th generation (5G) mobile communication network). The network architecture of this network may include a network side device (such as a base station) and a terminal. An information transmission method capable of being implemented on the network architecture is provided by the embodiment. The implementation environment of the information transmission method provided by the embodiment of the present application is not limited to the above network architecture.

A first communication node in this application may be a base station, and a second communication node may be a terminal. However, the first communication node and the second communication node are not limited to the above examples, and the examples are intended to facilitate understanding of the solution in the present application.

Figure 1:
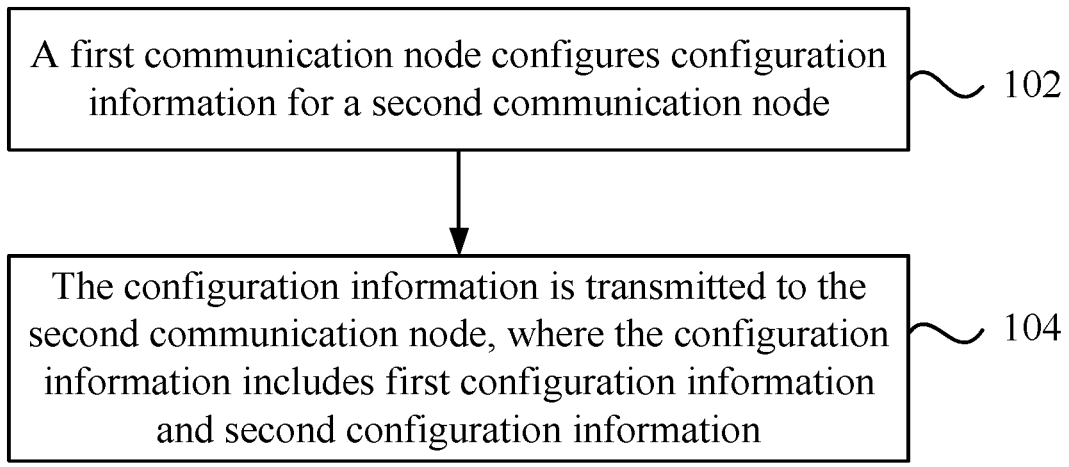
FIG. 1 is a flowchart of a method for determining precoding according to an embodiment of the present disclosure.

The present embodiment provides a method for determining precoding implemented on the network architecture described above. FIG. 1 is a flowchart of a method for determining precoding according to an embodiment of the present disclosure. As shown in FIG. 1, the process includes the steps described below.

In step 102, a first communication node configures configuration information for a second communication node.

In step 104, the configuration information is transmitted to the second communication node, where the configuration information includes first configuration information and second configuration information.

The first configuration information includes information of M or more resources and is used for instructing the second communication node to receive, on the M or more resources, a reference signal sent by the first communication node;

The second configuration information is used for indicating a manner in which the second communication node acquires the precoding based on combined measurement results of the M or more resources.

M is an integer greater than 1, and the M or more resources are located in a same resource setting.

In an embodiment, the above resources may include time domain resources, frequency domain resources, code domain resources, spatial domain resources, etc. There are combined measurement and joint measurement in this application, for example, if there are resources {1, 2, 3}, the combined measurement of the resources {1, 2, 3} may include measuring based on at least two of the resources {1, 2, 3}, which not only includes that parameters to be measured are measured by each resource involved in the measurement, but also includes that one or several certain parameters to be measured are measured by at least two resources involved in the measurement; the joint measurement of the resources {1, 2} may include that one or several certain parameters to be measured are measured based on resource 1 and resource 2. In an embodiment, resource setting may be resource settings.

Through the above steps, the first communication node configures configuration information for the second communication node and transmits the configuration information to the second communication node. The configuration information includes: first configuration information and second configuration information. After acquiring the above information, the second communication node receives, on M or more resources, the reference signals transmitted by the first communication node, measures the reference signals to obtain the precoding according to the manner in the second configuration information, and feeds back the precoding to the first communication node. The problem that a possibility of incomplete precoding information acquired on a receiving side exists in the related art is solved, the integrity and accuracy of the precoding acquired by the receiving side are guaranteed, and the communication performance of both parties is improved.

In one embodiment, the above steps may, but are not limited to, be executed by a base station, a terminal or the like.

In an embodiment, steps 102 and 104 may be executed in a reverse order, that is, the step 104 may be executed before the step 102.

In an embodiment, the second configuration information includes first signaling. The first signaling is used for indicating a measurement mode for the second communication node to acquire the precoding. The measurement mode includes performing a combined measurement of the M or more resources to acquire the precoding. In an embodiment, the first signaling is not actually related to transmissions of the first configuration information and the second configuration information, and the first signaling may not be transmitted at the same time as the first configuration information and the second configuration information.

In an embodiment, the second configuration information includes second signaling. The second signaling is used for indicating at least one of: in a case where the second communication node feeds back the precoding, a number of resources to be measured; or in a case where the second communication node feeds back the precoding, index numbers of the resources to be measured. In an embodiment, the second communication node performs measurement according to the number of resources described above and/or measures resources with the above index numbers to determine the precoding, and feeds back the precoding.

In an embodiment, the second communication node is further used for instructing the second communication node to measure a first resource to acquire first dimension precoding information and measure a second resource to acquire second dimension precoding information in a case where the precoding includes the first dimension precoding information and the second dimension precoding information. In an embodiment, the first resource and the second resource are not actually limited, and in an embodiment, and the first resource and the second resource may be different resources in the M or more resources.

In an embodiment, the second configuration information is further used for: instructing the second communication node to determine the measurement mode for measuring the precoding according to a relationship between a number of ports of the resources indicated by the first configuration information and a number of ports in a feedback report specified in the second configuration information; where the measurement mode includes: measuring a first resource to acquire first dimension precoding information of the precoding, and measuring a second resource to acquire second dimension precoding information of the precoding; where the first resource and the second resource are resources in the M or more resources.

In an embodiment, the second configuration information is used for: instructing the second communication node to determine the measurement mode for measuring the precoding according to a relationship between a number of ports of the resources indicated by the first configuration information and a number of ports in a feedback report specified in the second configuration information; where the measurement mode includes: acquiring the precoding based on a combined measurement of the M or more resources.

In an embodiment, the second configuration information includes third signaling, the third signaling is used for indicating a measurement mode for the second communication node to measure the precoding; where the measurement mode includes: measuring a first resource to acquire first dimension precoding information of the precoding, and measuring a second resource to acquire second dimension precoding information of the precoding; where the first resource and the second resource are the M or more resources. The first resource and the second resource are resources in the M or more resources. In an embodiment, precoding information on one dimension refers to information about a parameter in the precoding. The first dimension precoding information and the second dimension precoding information do not have a practically limited meaning, but are intended to indicate the precoding information of the two dimensions.

In an embodiment, the second configuration information includes fourth signaling, and the fourth signaling is used for indicating to the second communication node that precoding to be fed back includes precoding information of multiple dimensions, and a correspondence relationship between precoding information of each dimension and a measured resource of the dimension precoding information of the respective dimension.

In an embodiment, in a case of determining that ports in a feedback report of the second communication node are divided into multiple groups, the second configuration information is further used for indicating a first measurement mode, and the first measurement mode includes: determining, by the second communication node, distinction precoding information between an n-th group of ports and a 0-th group of ports based on a joint measurement of an n-th resource and a 0-th resource; where the distinction precoding information includes information about differences existing between precoding information of different port groups or ports; the 0-th resource includes a resource with a starting index number; a 0-th group of ports includes a starting port group; and n is a positive integer.

In an embodiment, dividing antenna ports of the first communication node into multiple groups may be specified in standard protocols. The associated port in the feedback report of the second communication node indicates that the first communication node may apply the precoding fed back by the second communication node to the ports indicated in the feedback report.

In an embodiment, the second configuration information is also used for instructing the second communication node to determine distinction precoding information between a first part of ports and a second part of ports which belong to the n-th group of ports based on the measurement of the n-th resource. In an embodiment, the first part of ports and the second part of ports are arranged according to an order of port numbers, the number of the first part of ports is the same as the number of the second part of ports, and a sum of the number of the first part of ports and the number of the second part of ports is a total number of ports included in the n-th group of ports.

In an embodiment, in a case of determining that ports in a feedback report of the second communication node are divided into multiple groups, the second configuration information is also used for indicating a second measurement mode, and the second measurement mode includes: determining, by the second communication node, distinction precoding information between an n-th group of ports and a 0-th group of ports based on a measurement of an n-th resource; where the first communication node applies the precoding fed back by the second communication node to the ports in the feedback report; the distinction precoding information includes information about differences existing between precoding information of different port groups or ports; a 0-th resource is a resource with a starting index number; the 0-th group of ports is a starting port group; and n is a positive integer.

In an embodiment, after the second communication node determines the distinction precoding information between the n-th group of ports and the 0-th group of ports, the second communication node reports the precoding information of the 0-th group of ports, and the distinction precoding information between other groups of ports and the 0-th group of ports.

In an embodiment, in a case of determining ports in a feedback report of the second communication node are divided into multiple groups, the second configuration information is further used for indicating a third measurement mode, and the third measurement mode is used for indicating to the second communication node at least one of: acquiring distinction precoding information between different port groups by measuring of a resource; and acquiring distinction precoding information between multiple ports in a port group by measuring of another resource. That is, distinction precoding information between different port groups is acquired by measuring of a third resource; distinction precoding information between multiple ports in the port group is acquired by measuring of a fourth resource. The first communication node applies the precoding fed back by the second communication node to the ports in the feedback report; the distinction precoding information includes information about differences existing between precoding information of different port groups or ports; and the third resource and the fourth resource are different resources in the M or more resources. In an embodiment, the distinction precoding information between the port groups refers to the distinction precoding information between other groups of ports and the 0-th group of ports.

In an embodiment, the second configuration information includes fifth signaling. The fifth signaling is used for indicating a measurement mode for the second communication node to measure the distinction precoding information between an n-th group of ports and a 0-th group of ports; where the 0-th group of ports is a starting port group, and n is a positive integer. In an embodiment, the measurement mode may include information on a first measurement mode, a second measurement mode or a third measurement mode, and a fourth measurement mode, etc., mentioned in the embodiment.

In an embodiment, the second configuration information includes sixth signaling. The sixth signaling is used for indicating a fourth measurement mode for the second communication node to measure distinction precoding information between an n-th group of ports and a 0-th group of ports, the fourth measurement mode includes one of the following.

the distinction precoding information between the n-th group of ports and the 0-th group of ports is determined based on measurement of an n-th resource. For example, distinction precoding information between a first group of ports and the 0-th group of ports is measured by a resource, distinction precoding information between a second group of ports and the 0-th group of ports is measured by another resource, and distinction precoding information between a third group of ports and the 0-th group of ports is measured by yet another resource.

The distinction precoding information is determined between the n-th group of ports and the 0-th group of ports based on the measurement of a designated resource in the M or more resources. For example, the distinction precoding information between the first group of ports and the 0-th group of ports, the distinction precoding information between the second group of ports and the 0-th group of ports, and the distinction precoding information between the third group of ports and the 0-th group of ports are measured through a same resource, that is, the distinction precoding information between all port groups is measured through a same resource.

The 0-th group of ports is a starting port group, and n is a positive integer.

In an embodiment, in a case of determining ports in a feedback report of the second communication node are divided into multiple groups, the first communication node indicates in the first configuration information that the M or more resources are divided into two groups, one group of resources in the two group is used for calculating distinction precoding information between multiple groups of ports, the other group of resources in the two group is used for calculating distinction precoding information between different ports in a port group.

Figure 2:
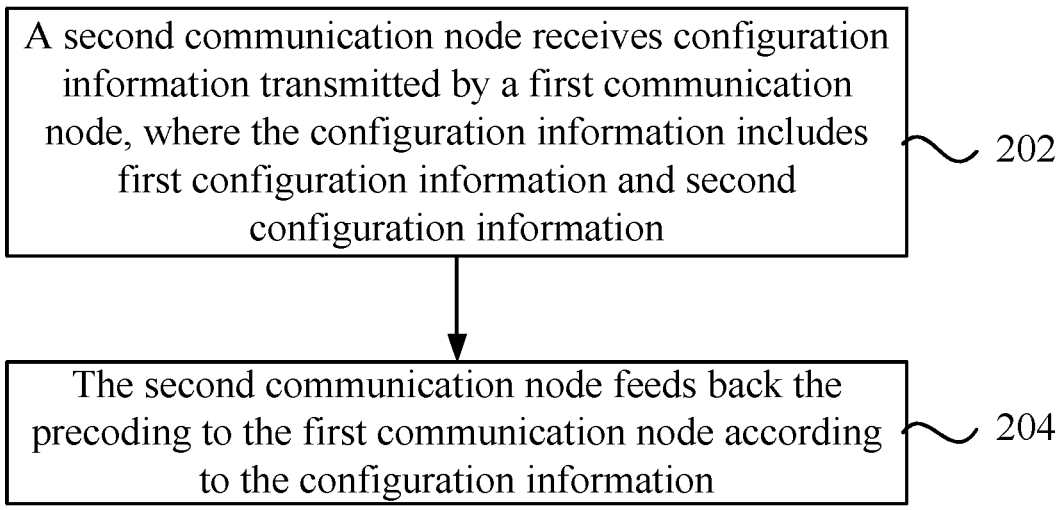
FIG. 2 is a flowchart of another method for determining precoding according to an embodiment of the present disclosure.

According to another embodiment of the present disclosure, another method for determining precoding is provided, which may be applied to a second communication node, as shown in FIG. 2, the method includes steps 202 to 204.

In step 202, a second communication node receives configuration information transmitted by a first communication node, where the configuration information includes first configuration information and second configuration information.

In step 204, the second communication node feeds back the precoding to the first communication node according to the configuration information.

The first configuration information includes information of M or more resources and is used for instructing the second communication node to receive, on the M or more resources, a reference signal sent by the first communication node.

The second configuration information is used for indicating a manner in which the second communication node acquires the precoding based on combined measurement results of the M or more resources.

M is an integer greater than 1, and the M or more resources are located in a same resource setting.

In an embodiment, the step in which the second communication node feeds back the precoding to the first communication node according to the configuration information includes: in a case of determining ports in a feedback report of the second communication node are divided into multiple groups, determining, by the second communication node according to the configuration information, precoding of a 0-th group of ports and distinction precoding information between each group of other groups of ports and the 0-th group of ports; feeding back, by the second communication node, the precoding of the 0-th group of ports and the distinction precoding information to the first communication node; where the distinction precoding information includes information about differences existing between precoding information of different port groups or ports, and the 0-th group of ports includes a starting port group.

Generally, the precoding information of the 0-th group of ports is obtained based on measurement of a specified resource.

The second communication node receives the reference signal transmitted by the first communication node on M or more resources, obtains the precoding based on the reference signal measurement according to the manner in the second configuration information, and feeds back the precoding to the first communication node. By adopting the above technical solution, the problem that a possibility of incomplete precoding information acquired on a receiving side exists in the related art is solved, the integrity and accuracy of the precoding acquired by the receiving side are guaranteed, and the communication performance of both parties is improved.

Embodiment Two

The present disclosure provides a method and device (system) for determining precoding to overcome the problem that the precoding cannot be measured because the number of antenna ports of reference signals transmitted on a single resource in the related art is less than the number of antenna ports actually used.

Figure 3:
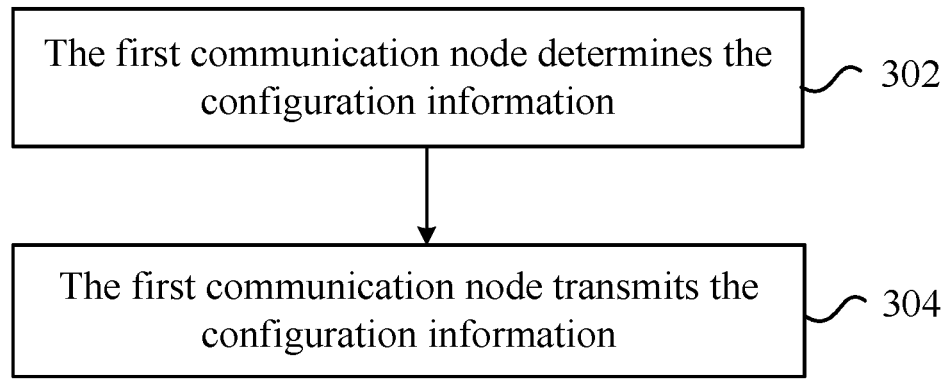
FIG. 3 is a flowchart of a method for determining precoding by a first communication node according to an embodiment of the present disclosure.

FIG. 3 is a flowchart of a method for determining precoding by a first communication node according to an embodiment of the present disclosure. As shown in FIG. 3, the flowchart includes the steps described below.

In step 302, a first communication node determines a configuration information.

In step 304, the first communication node transmits the configuration information.

The embodiment of the present disclosure discloses a method for determining precoding. The method includes: determining, by a first communication node, one or more pieces of configuration information; and transmitting, by the first communication node, the configuration information to a second communication node; where the configuration information includes the following contents: configuration information on M or more resources, and precoding configuration information in a feedback report.

M is an integer greater than 1, and the M resources are located in a same resource setting; the precoding is the precoding obtained based on the combined measurement of the M resources.

"First" and "second" has no order difference, and are only used for distinguishing two different nodes.

In an embodiment, in order to obtain a channel state during communication, measuring the signal is on resources is usually arranged, and the resources are resources defined in a frequency domain and a time domain. To facilitate configuring the resources, the resources are organized in a certain hierarchical structure, one or more resources form a resource set, one or more resource sets form a resource setting (resource settings); resources in the a same resource setting belong to a same type, and are used for transmitting or measuring the same type of signals. Precoding is also a part of the channel state.

For example, the type of the resources is one of the following types: a channel state information-interference measurement resource (CSI-IM resource), which is a resource used for interference measurement of channel state information; a channel state information-reference signal resource (CSI-RS resource), which is a resource used for a channel state information reference signal; a synchronization signal and physical broadcast channel block resource (SS/PBCH resource), which a resource is used for the synchronization signal and the physical broadcast channel block.

For example, the type of the resources is one of the following types: the CSI-IM resource, which is a resource used for the interference measurement of the channel state information; an non-zero power channel state information-reference signal resource (non-zero power CSI-RS resource), which is a resource used for an non-zero power channel state information reference signal; a zero power channel state information-reference signal resource (zero power CSI-RS resource), which is a resource used for a zero power channel state information reference signal; a synchronization signal and physical broadcast channel block resource (SS/PBCH resource), which is a resource used for the synchronization signal and physical broadcast channel block.

For example, the type of the resources is one of the following types: the CSI-IM resource, which is a resource used for the interference measurement of the channel state information; the non-zero power CSI-RS resource for the channel measurement, which is a resource used for the channel measurement of the non-zero power CSI-RS; the non-zero power CSI-RS resource for the interference measurement, which is a resource used for the interference measurement of the non-zero power CSI-RS; or the synchronization signal and physical broadcast channel block resource (SS/PBCH resource), which is a resource used for the synchronization signal and the physical broadcast channel block.

The description of obtaining the precoding based on the combined measurement of multiple resources is as follows: the precoding includes multiple parameters, for example, part of the parameters are measured by using one resource, and other part of the parameters is measured by using another resource; or for example, part of parameters are jointly measured by multiple resources.

For example, $W_{l,m,n}$ is a precoding and is formed by:

$$W_{l,m,n} = \begin{bmatrix} v_{l,m} \\ \varphi_n v_{l,m} \end{bmatrix}$$

$$\varphi_n = e^{j\pi n/2}$$

$$u_m = \left[1, e^{j\frac{2\pi m}{O_2 N_2}}, \ldots, e^{j\frac{2\pi m(N_2-1)}{O_2 N_2}}\right]^T$$

$$v_{l,m} = \left[u_m, e^{j\frac{2\pi m}{O_1 N_1}} u_m, \ldots, e^{j\frac{2\pi m(N_1-1)}{O_1 N_1}} u_m\right]^T.$$

That is, the precoding $W_{l,m,n}$ is determined by three parameters {l, m, n}. This precoding may be obtained by the combined measurement of multiple resources. The method may be one of: l is obtained by measuring a first resource, m is obtained by measuring a second resource, and n is obtained by measuring a third resource; l, n are obtained by measuring the first resource, m is obtained by measuring the second resource; l is obtained by measuring the first resource, m, n are obtained by measuring the second resource; l, m are obtained by measuring the first resource, and n is obtained by measuring the second resource.

For another example, $W_{l,m,p,n}$ is a precoding and is formed by:

$$W_{l,m,p,n} = \begin{bmatrix} v_{l,m} \\ \varphi_n v_{l,m} \\ \varphi_p v_{l,m} \\ \varphi_n \varphi_p v_{l,m} \end{bmatrix}$$

$$\varphi_n = e^{j\pi n/2}$$

$$\varphi_p = e^{j\pi p/2}$$

$$u_m = \left[1, e^{j\frac{2\pi m}{O_2 N_2}}, \ldots, e^{j\frac{2\pi m(N_2-1)}{O_2 N_2}}\right]^T$$

$$v_{l,m} = \left[u_m, e^{j\frac{2\pi m}{O_1 N_1}} u_m, \ldots, e^{j\frac{2\pi m(N_1-1)}{O_1 N_1}} u_m\right]^T.$$

That is, $W_{l,m,n,p}$ is determined by 4 parameters {l, m, n, p}. This precoding may be obtained the combined measurement of multiple resources. The method may be one of the following: l is obtained by measuring the first resource, m is obtained by measuring the second resource, and n is obtained by measuring the third resource, p is obtained by measuring the fourth resource; l, n are obtained by measuring the first resource, m is obtained by measuring the second resource, p is obtained by measuring the third resource; l, m, n are obtained by measuring the first resource, p is measured jointly by the first resource and the second resource; l, m are obtained by measuring the first resource, n and p are measured jointly by the first resource and the second resource.

In an embodiment, the first communication node configures a signaling to indicate a feedback type, and one feedback type is that the feedback precoding is the precoding obtained based on the combined measurement of the M resources.

In an embodiment, the present disclosure includes a signaling, and a content of the signaling indicates whether to use the following feedback type: the feedback precoding is the precoding obtained based on the combined measurement of the M resources.

For example, the signaling indication uses one of the following feedback types: feeding back the precoding obtained based on the combined measurement of the M resources; and not feeding back the precoding.

For another example, the signaling indication uses one of the following feedback types: feeding back the precoding obtained based on the combined measurement of the M resources; feeding back the precoding obtained based on measurement of one resource; and not feeding back the precoding.

The content of the feedback comes from the measurement, and the measurement result is used for feedback, so the measurement type may also be indicated through the signaling, thereby indicating the feedback type.

In an embodiment, the first communication node configures a signaling to indicate at least one of the following: a number of resources measured for feeding back precoding information; index numbers of the resources measured for feeding back the precoding information.

Examples are as follows: the number of resources may be an integer greater than or equal to zero, such as 1, 2 or N, where N is an integer greater than or equal to zero. The number of resources may be a range, such as a single or multiple, such as greater than N, where N is an integer greater than or equal to zero.

Another example is as follows: the index numbers of resources may either be identification numbers configured by the first communication node for the resource, or be order numbers in a configuration queue.

The content of the feedback comes from the measurement, and the measurement result is used for feedback, so the measurement type may also be indicated through the signaling, thereby indicating the feedback type.

In an embodiment, the precoding information includes first dimension precoding information and second dimension precoding information; where the first dimension precoding information is obtained from the first Resource, and the second dimension precoding information is obtained from the second resource; the first dimension and the second dimension are merely for describing two different dimensions, and no sequence is provided between the first dimension and the second dimension; the first resource and the second resource are merely for describing two different resources, and no sequence is provided between the first resource and the second resource.

In an embodiment, a precoding is determined by the parameters included in the precoding, and one parameter is precoding information in one diminution; the first dimension precoding information is obtained from the first resource, that is, the first parameter is obtained by the measurement of the first resource; and the second dimension precoding information is obtained by the measurement of the second resource, that is, the second parameter is obtained by the measurement of the second resource.

For example, $W_{l,m,n}$ is a precoding and is formed by:

$$W_{l,m,n} = \begin{bmatrix} v_{l,m} \\ \varphi_n v_{l,m} \end{bmatrix}$$

$$\varphi_n = e^{j\pi n/2}$$

$$u_m = \left[1, e^{j\frac{2\pi m}{O_2 N_2}}, \ldots, e^{j\frac{2\pi m(N_2-1)}{O_2 N_2}}\right]^T$$

$$v_{l,m} = \left[u_m, e^{j\frac{2\pi m}{O_1 N_1}} u_m, \ldots, e^{j\frac{2\pi m(N_1-1)}{O_1 N_1}} u_m\right]^T$$

That is, the precoding $W_{l,m,n}$ is determined by three parameters {l, m, n}, including parameter l, m and n; precoding information in a first dimension is the parameter l and is obtained by measuring the first resource; precoding information in a second dimension is the parameter m and is obtained by measuring the second resource; precoding information is the parameter n and is obtained by measuring the third resource Alternatively, the precoding information in the first dimension is the parameter l and is obtained by measuring the first resource; the precoding information in the second dimension is the parameter m and is obtained by measuring the second resource; and the precoding information in the third dimension is the parameter n and is obtained by measuring the first resource.

Alternatively, the precoding information in the first dimension is the parameter l and is obtained by measuring the first resource; the precoding information in the second dimension is the parameter m and is obtained by measuring the second resource; and the precoding information in the third dimension is the parameter n and is obtained by measuring the second resource.

For another example, $W_{l,m,p,n}$ is a precoding and is formed by:

$$W_{l,m,p,n} = \begin{bmatrix} v_{l,m} \\ \varphi_n v_{l,m} \\ \varphi_p v_{l,m} \\ \varphi_n \varphi_p v_{l,m} \end{bmatrix}$$

$$\varphi_n = e^{j\pi n/2}$$

$$\varphi_p = e^{j\pi p/2}$$

$$u_m = \left[1, e^{j\frac{2\pi m}{O_2 N_2}}, \ldots, e^{j\frac{2\pi m(N_2-1)}{O_2 N_2}}\right]^T$$

$$v_{l,m} = \left[u_m, e^{j\frac{2\pi m}{O_1 N_1}} u_m, \ldots, e^{j\frac{2\pi m(N_1-1)}{O_1 N_1}} u_m\right]^T$$

That is, $W_{l,m,n,p}$ is determined by four parameters {l, m, n, p}, including parameters l, m, n and p; the precoding information in the first dimension is the parameter l and is obtained by measuring the first resource; the precoding information in the second dimension is the parameter m and is obtained by measuring the second resource; the precoding information is the parameter n and is obtained by measuring the third resource, and precoding information in a fourth dimension is the parameter p and is obtained by measuring a fourth resource.

Alternatively, the precoding information in the first dimension is the parameter l and is obtained by measuring the first resource; the precoding information in the second dimension is the parameter m and is obtained by measuring the second resource; and the precoding information in the third dimension is the parameter n and is obtained by measuring the first resource; and the precoding information in the third dimension is the parameter p and is obtained by measuring the third resource.

Alternatively, the precoding information in the first dimension is the parameter l and is obtained by measuring the first resource; the precoding information in the second dimension is the parameter m and is obtained by measuring the second resource; and the precoding information in the third dimension is the parameter n and is obtained by measuring the second resource; and the precoding information in the fourth dimension is the parameter p and is obtained by measuring the third resource.

Alternatively, the precoding information in the first dimension is the parameter l and is obtained by measuring the first resource; the precoding information in the second dimension is the parameter m and is obtained by measuring the second resource; and the precoding information in the third dimension is the parameter n and is obtained by measuring the third resource; and the precoding information in the fourth dimension is the parameter p and is obtained by measuring the third resource.

Alternatively, the precoding information in the first dimension is the parameter l and is obtained by measuring the first resource; the precoding information in the second dimension is the parameter m and is obtained by measuring the second resource; and the precoding information in the third dimension is the parameter n and is obtained by measuring the first resource; and the precoding information in the fourth dimension is the parameter p and is obtained by measuring the first resource.

In an embodiment, the following feedback type is indicated by a relationship between the number of ports of the resources and the number of ports of the feedback report: the first dimension precoding information is obtained from the first resource, and the second dimension precoding information is obtained from the second resource; where the first dimension and the second dimension are merely for describing two different dimensions, no sequence is provided between the first dimension and the second dimension; where the first resource and the second resource are merely for describing two different resources, no sequence is provided between the first resource and the second resource.

Examples are as follows: the number of antenna ports of the first resource is N1, the number of antenna ports of the second resource is N2, and the number of antenna ports of the feedback report is Nr; a relationship of Nr=N1*N2 indicates the feedback type; or a relationship of Nr=N1*N2/2 indicates the feedback type; or Nr=N1*N2*2 indicates the described type. "*" denotes a multiplication operation, "/" denotes a division operation.

In an embodiment, the following feedback type is indicated by the relationship between the number of ports of the resources and the number of ports of the feedback report: the fed back precoding is the precoding obtained based on the combined measurement of the M resources.

Examples are as follows: the number of antenna ports of the first resource is N1, the number of antenna ports of the second resource is N2, and the number of antenna ports of the feedback report is Nr; a relationship of Nr>N1 indicates the feedback type; or a relationship of Nr=N1+N2 indicates the feedback type.

In an embodiment, the first communication node configures a signaling for indicating the feedback type. A candidate type is that: the first dimension precoding information is obtained by the measurement of the first resource, and the second dimension precoding information is obtained by the measurement of the second resource; where the first dimension and the second dimension are merely for describing two different dimensions, no sequence is provided between the first dimension and the second dimension; where the first resource and the second resource are merely for describing two different resources, no sequence is provided between the first resource and the second resource.

For example, the first communication node configures a signaling to indicate one of the following candidate feedback types: the first dimension precoding information is obtained by the measurement of the first resource, and the second dimension precoding information is obtained by the measurement of the second resource; or the precoding information is not fed back.

For another example, the first communication node configures a signaling to indicate one of the following candidate feedback types: the first dimension precoding information is obtained by the measurement of the first resource, and the second dimension precoding information is obtained by the measurement of the second resource; all precoding information is obtained by the measurement of the first resource; or the precoding information is not fed back.

In an embodiment, the first communication node configures a signaling to indicate: a correspondence between each piece of dimension precoding information and a resource that measures each piece of dimension precoding information.

For example, the correspondence relationship between precoding information of each dimension and a measured resource of the precoding information of the respective dimension may be one of: the first dimension precoding information is obtained from the first resource, and the second dimension precoding information is obtained from the second resource; the first dimension precoding information and the third dimension precoding information are obtained from the first resource, the second dimension precoding information is obtained from the second resource; the first dimension precoding information is obtained from the first resource, the second dimension precoding information and the third dimension precoding information are obtained from the second resource; the first dimension precoding information is obtained from the second resource, and the second dimension precoding information is obtained from the first resource; the first dimension precoding information and the third dimension precoding information are obtained from the second resource, and the second dimension precoding information is obtained from the first resource; or the first dimension precoding information is obtained from the second resource, and the second dimension precoding information and the third dimension precoding information are obtained from the first resource.

In an embodiment, ports in feedback report information are divided into multiple groups, and the precoding information between an n-th group of ports and a 0-th group of ports is based on the joint measurement of the n-th resource and the 0-th resource; where the 0-th resource refers to the resource with a starting index number; the 0-th group of ports refers to a starting group of ports.

For example, $W_{l,m,p,n}$ is a precoding and is formed by:

$$W_{l,m,p,n} = \begin{bmatrix} v_{l,m} \\ \varphi_n v_{l,m} \\ \varphi_{p_1} v_{l,m} \\ \varphi_n \varphi_{p_1} v_{l,m} \\ \varphi_{p_2} v_{l,m} \\ \varphi_n \varphi_{p_2} v_{l,m} \\ \varphi_{p_3} v_{l,m} \\ \varphi_n \varphi_{p_3} v_{l,m} \end{bmatrix}$$

$$\varphi_n = e^{j\pi n/2}$$

$$\varphi_{p_k} = e^{j\pi p_k/2}$$

$$u_m = \left[1, e^{j\frac{2\pi m}{O_2 N_2}}, \ldots, e^{j\frac{2\pi m(N_2-1)}{O_2 N_2}}\right]^T$$

$$v_{l,m} = \left[u_m, e^{j\frac{2\pi m}{O_1 N_1}} u_m, \ldots, e^{j\frac{2\pi m(N_1-1)}{O_1 N_1}} u_m\right]^T$$

$$p = [p_1, p_2, p_3].$$

That is, $W_{l,m,n,p}$ is determined by parameters $\{l, m, n, p_1, p_2, p_3,\}$, where a vector $[v_{l,m}, \varphi_n v_{l,m}]^T$ corresponds to the 0-th group of ports, a vector $[\varphi_{p_1} v_{l,m}, \varphi_n \varphi_{p_1} v_{l,m}]^T$ corresponds to a first group of ports, and a vector $[\varphi_{p_2} v_{l,m}, \varphi_n \varphi_{p_2} v_{l,m}]^T$ corresponds to a second group of ports, and the vector $[\varphi_{p_3} v_{l,m}, \varphi_n \varphi_{p_3} v_{l,m}]^T$ corresponds to a third group of ports; precoding information between the first group of ports and the 0-th group of ports is a parameter $p_1$, which is obtained by the joint measurement of the first resource and a 0-th resource; precoding information between the second group of ports and the 0-th group of ports is a parameter $p_2$, which is obtained by the joint measurement of the second resource and the 0-th resource; and precoding information between the third group of ports and the 0-th group of ports is a parameter $p_3$, which is obtained by the joint measurement of the third resource and the 0-th resource.

In an embodiment, precoding information between a first half of ports and a second half of ports of the n-th group of ports is measured based on the n-th resource.

For example, $W_{l,m,p,n}$ is a precoding and is formed by:

$$W_{l,m,p,n} = \begin{bmatrix} v_{l,m} \\ \varphi_{n_0} v_{l,m} \\ \varphi_{p_1} v_{l,m} \\ \varphi_{n_1} \varphi_{p_1} v_{l,m} \\ \varphi_{p_2} v_{l,m} \\ \varphi_{n_2} \varphi_{p_2} v_{l,m} \\ \varphi_{p_3} v_{l,m} \\ \varphi_{n_3} \varphi_{p_3} v_{l,m} \end{bmatrix}$$

$$\varphi_{n_q} = e^{j\pi n_q/2}$$

$$\varphi_{p_k} = e^{j\pi p_k/2}$$

$$u_m = \left[1, e^{j\frac{2\pi m}{O_2 N_2}}, \ldots, e^{j\frac{2\pi m(N_2-1)}{O_2 N_2}}\right]^T$$

$$v_{l,m} = \left[u_m, e^{j\frac{2\pi m}{O_1 N_1}} u_m, \ldots, e^{j\frac{2\pi m(N_1-1)}{O_1 N_1}} u_m\right]^T$$

$$p = [p_1, p_2, p_3]$$

$$n = [n_0, n_1, n_2, n_3].$$

That is, $W_{l,m,n,p}$ is determined by parameters $\{l, m, n_0, n_1, n_2, n_3, p_1, p_2, p_3\}$; where an vector $[v_{l,m}, \varphi_n v_{l,m}]^T$ corresponds to the 0-th group of ports, an vector $[\varphi_{p_1} v_{l,m}, \varphi_n \varphi_{p_1} v_{l,m}]^T$ corresponds to the first group of ports, an vector $[\varphi_{p_2} v_{l,m}, \varphi_n \varphi_{p_2} v_{l,m}]^T$ corresponds to the second group of ports, and an vector $[\varphi_{p_3} v_{l,m}, \varphi_n \varphi_{p_3} v_{l,m}]^T$ corresponds to the third group of ports; precoding information between a second half of ports and a first half of ports of the 0-th group is a parameter $n_0$, and is obtained by the joint measurement of the 0-th resource; precoding information between a second half of ports and a first half of ports of the first group is a parameter $n_1$, and is obtained by the joint measurement of the first resource; precoding information between a second half of ports and a first half of ports of the second group is a parameter $n_2$, and is obtained by the joint measurement of the second resource; and precoding information between a second half of ports and a first half of ports of the third group is a parameter $n_3$, and is obtained by the joint measurement of the third resource.

In an embodiment, ports in report information are divided into multiple groups, and the precoding information between the n-th group of ports and the 0-th group of ports is based on the measurement of the n-th resource; where the 0-th resource refers to the resource with the starting index number; and the 0-th group of ports refers to the starting group of ports.

For example, $W_{l,m,p,n}$ is a precoding and is formed by:

$$W_{l,m,p,n} = \begin{bmatrix} v_{l,m} \\ \varphi_n v_{l,m} \\ \varphi_{p_1} v_{l,m} \\ \varphi_n \varphi_{p_1} v_{l,m} \\ \varphi_{p_2} v_{l,m} \\ \varphi_n \varphi_{p_2} v_{l,m} \\ \varphi_{p_3} v_{l,m} \\ \varphi_n \varphi_{p_3} v_{l,m} \end{bmatrix}$$

$$\varphi_n = e^{j\pi n/2}$$

$$\varphi_{p_k} = e^{j\pi p_k/2}$$

$$u_m = \left[1, e^{j\frac{2\pi m}{O_2 N_2}}, \ldots, e^{j\frac{2\pi m(N_2-1)}{O_2 N_2}}\right]^T$$

$$v_{l,m} = \left[u_m, e^{j\frac{2\pi m}{O_1 N_1}} u_m, \ldots, e^{j\frac{2\pi m(N_1-1)}{O_1 N_1}} u_m\right]^T$$

$$p = [p_1, p_2, p_3].$$

That is, $W_{l,m,n,p}$ is determined by parameters $\{l, m, n, p_1, p_2, p_3,\}$ where $[v_{l,m}, \varphi_n v_{l,m}]^T$ corresponds to the 0-th group of ports, the vector $[\varphi_{p_1} v_{l,m}, \varphi_n \varphi_{p_1} v_{l,m}]^T$ corresponds to the first group of ports, and the vector $[\varphi_{p_2} v_{l,m}, \varphi_n \varphi_{p_2} v_{l,m}]^T$ corresponds to the second group of ports. The vector $[\varphi_{p_3} v_{l,m}, \varphi_n \varphi_{p_3} v_{l,m}]^T$ corresponds to the third group of ports; the precoding information between the first group of ports and the 0-th group of ports is the parameter $p_1$, which is obtained by the measurement of the first resource; the precoding information between the second group of ports and the 0-th group of ports is the parameter $p_2$, which is obtained by the measurement of the second resource; and the precoding information between the third group of ports and the 0-th group of ports is the parameter $p_3$, which is obtained by the measurement of the third resource.

In an embodiment, the ports in the report information are divided into multiple groups, and the precoding information between the port groups is obtained by measuring one resource; the precoding information between the ports in the port group is obtained by measuring another resource.

For example, $W_{l,m,p,n}$ is a precoding and is formed by:

$$W_{l,m,p,n} = \begin{bmatrix} v_{l,m} \\ \varphi_n v_{l,m} \\ \varphi_{p_1} v_{l,m} \\ \varphi_n \varphi_{p_1} v_{l,m} \\ \varphi_{p_2} v_{l,m} \\ \varphi_n \varphi_{p_2} v_{l,m} \\ \varphi_{p_3} v_{l,m} \\ \varphi_n \varphi_{p_3} v_{l,m} \end{bmatrix}$$

$$\varphi_n = e^{j\pi n/2}$$

$$\varphi_{p_k} = e^{j\pi p_k/2}$$

$$u_m = \left[1, e^{j\frac{2\pi m}{O_2 N_2}}, \ldots, e^{j\frac{2\pi m(N_2-1)}{O_2 N_2}}\right]^T$$

$$v_{l,m} = \left[u_m, e^{j\frac{2\pi m}{O_1 N_1}} u_m, \ldots, e^{j\frac{2\pi m(N_1-1)}{O_1 N_1}} u_m\right]^T$$

$$p = [p_1, p_2, p_3].$$

That is, $W_{l,m,n,p}$ is determined by parameters $\{l, m, n, p_1, p_2, p_3,\}$ where the vector $[v_{l,m}, \varphi_n v_{l,m}]^T$ corresponds to the 0-th group of ports, the vector $[\varphi_{p_1} v_{l,m}, \varphi_n \varphi_{p_1} v_{l,m}]^T$ corresponds to the first group of ports, and the vector $[\varphi_{p_2} v_{l,m}, \varphi_n \varphi_{p_2} v_{l,m}]^T$ corresponds to the second group of ports, the vector $[\varphi_{p_3} v_{l,m}, \varphi_n \varphi_{p_3} v_{l,m}]^T$ corresponds to the third group of ports; and the precoding information between the first group of ports and the 0-th group of ports is the parameter $p_1$, which is obtained by the measurement of the first resource; the precoding information between the second group of ports and the 0-th group of ports is the parameter $p_2$, which is obtained by the measurement of the first resource; the precoding information between the third group of ports and the 0-th group of ports is the parameter $p_3$, which is obtained by the measurement of the first resource; that is, the precoding information between the port groups is obtained by the measurement of the same resource. Precoding information between ports in the 0-th group, precoding information between ports in the first group, precoding information between ports in the second group, and precoding information between ports in the third group are all parameters $\{l, m, n\}$, and obtained by the measurement of another resource.

In an embodiment, the base station configures a signaling to indicate: a method for determining precoding between the n-th group of ports and the 0-th group of ports in the feedback report; where the 0-th group of ports refers to the starting group of ports.

For example: the method for determining precoding between the n-th group of ports and the 0-th group of ports is one of: precoding information between the n-th group of ports and the 0-th group of ports based on measurement of the n-th resource; or precoding information between the n-th group of ports and the 0-th group of ports based on measurement of the n-th group of ports and the first group of ports of one resource in all resources.

In an embodiment, the base station configures a signaling to indicate the feedback type, and one of the candidate types is one of: the precoding information between the n-th group of ports and the 0-th group of ports is based on the measurement of the n-th resource; or the precoding information between the n-th group of ports and the 0-th group of ports is based on the measurement of the n-th group of ports and the 0-th group of ports of one of the resources; where the 0-th group of ports refers to the starting group of ports.

In an embodiment, ports in report information are divided into multiple groups, and the configured resources are divided into two groups, one group of resources is used for calculating the precoding between multiple groups of ports, and the other group of resources is used for calculating the precoding between ports in the port group.

For example, $W_{l,m,p,n}$ is a precoding and is formed by:

$$W_{l,m,p,n} = \begin{bmatrix} v_{l,m} \\ \varphi_{n_0} v_{l,m} \\ \varphi_{p_1} v_{l,m} \\ \varphi_{n_1} \varphi_{p_1} v_{l,m} \\ \varphi_{p_2} v_{l,m} \\ \varphi_{n_2} \varphi_{p_2} v_{l,m} \\ \varphi_{p_3} v_{l,m} \\ \varphi_{n_3} \varphi_{p_3} v_{l,m} \end{bmatrix}$$

$$\varphi_{n_q} = e^{j\pi n_q/2}$$

$$\varphi_{p_k} = e^{j\pi p_k/2}$$

$$u_m = \left[1, e^{j\frac{2\pi m}{O_2 N_2}}, \ldots, e^{j\frac{2\pi m(N_2-1)}{O_2 N_2}}\right]^T$$

$$v_{l,m} = \left[u_m, e^{j\frac{2\pi m}{O_1 N_1}} u_m, \ldots, e^{j\frac{2\pi m(N_1-1)}{O_1 N_1}} u_m\right]^T$$

$$p = [p_1, p_2, p_3]$$

$$n = [n_0, n_1, n_2, n_3].$$

That is, $W_{l,m,n,p}$ is determined by parameters $\{l, m, n_0, n_1, n_2, n_3, p_1, p_2, p_3\}$; a vector $[v_{l,m}, \varphi_n v_{l,m}]^T$ corresponds to a 0-th group of ports, a vector $[\varphi_{p_1} v_{l,m}, \varphi_n \varphi_{p_1} v_{l,m}]^T$ corresponds to a first group of ports, a vector $[\varphi_{p_2} v_{l,m}, \varphi_n \varphi_{p_2} v_{l,m}]^T$ corresponds to a second group of ports, and a vector $[\varphi_{p_3} v_{l,m}, \varphi_n \varphi_{p_3} v_{l,m}]^T$ corresponds to a third group of ports; a first group of resources includes a resource 0, a resource 1, and a resource 2; and a second group of resources includes a resource 3, a resource 4, a resource 5 and a resource 6. The precoding information may be obtained by the following measurement.

The precoding information between the first group of ports and the 0-th group of ports is the parameter $p_1$, which is obtained by the measurement of the resource 0; the precoding information between the second group of ports and the 0-th group of ports is the parameter $p_2$, which is obtained by the measurement of the resource 1; the precoding information between the third group of ports and the 0-th group of ports is the parameter $p_3$, which is obtained by the measurement of the resource 2; that is, precoding information between the port groups is obtained by the measurement of the first group of resources. Precoding information between ports in the 0-th group is parameters $\{l, m, n_0\}$ and is obtained by the measurement of the resource 3; precoding information between ports in the first group is parameters $\{l, m, n_1\}$ and is obtained by the measurement of the resource 4; precoding information between ports in the second group is parameters $\{l, m, n_2\}$, and is obtained by the measurement of the resource 5; precoding information between ports in the third group is the parameters $\{l, m, n_2\}$, and is obtained by the measurement of the resource 6; that is, precoding information between the ports in the port group is obtained by the measurement of the second group of resources.

Alternatively, the precoding information may be obtained by the following measurement.

The precoding information between the first group of ports and the 0-th group of ports is the parameter $p_1$, which is obtained by the measurement of the resource 0; the precoding information between the second group of ports and the 0-th group of ports is the parameter $p_2$, which is obtained by the measurement of the resource 0; the precoding information between the third group of ports and the 0-th group of ports is the parameter $p_3$, which is obtained by the measurement of the resource 0; that is, the precoding information between the port groups is obtained by the measurement of the first group of resources 0. The precoding information between ports in the 0-th group is parameters $\{l, m, n_0\}$ and is obtained by the measurement of the resource 3; the precoding information between ports in the first group is parameters $\{l, m, n_1\}$ and is obtained by the measurement of the resource 3; the precoding information between ports in the second group is parameters $\{l, m, n_2\}$, and is obtained by the measurement of the resource 3; the precoding information between ports in the third group is the parameters $\{l, m, n_2\}$, and is obtained by the measurement of the resource 3; that is, the precoding information between the ports in the port groups is obtained by the measurement of the second group of resources 3.

According to another embodiment, a method for determining precoding is further provided. The method includes receiving, by a second communication node, configuration information transmitted by a first communication node, where the configuration information includes configuration information of M or more resources and precoding configuration information in the feedback report; analyzing the configuration information by the second communication node, and feeding back the precoding information by the second communication node; where M is an integer greater than 1, and the M or more resources are located in same resource settings; the precoding is precoding based on the combined measurement of M resources; and where "first" and "second" has no order difference, and are only used for distinguishing two different nodes.

Figure 4:
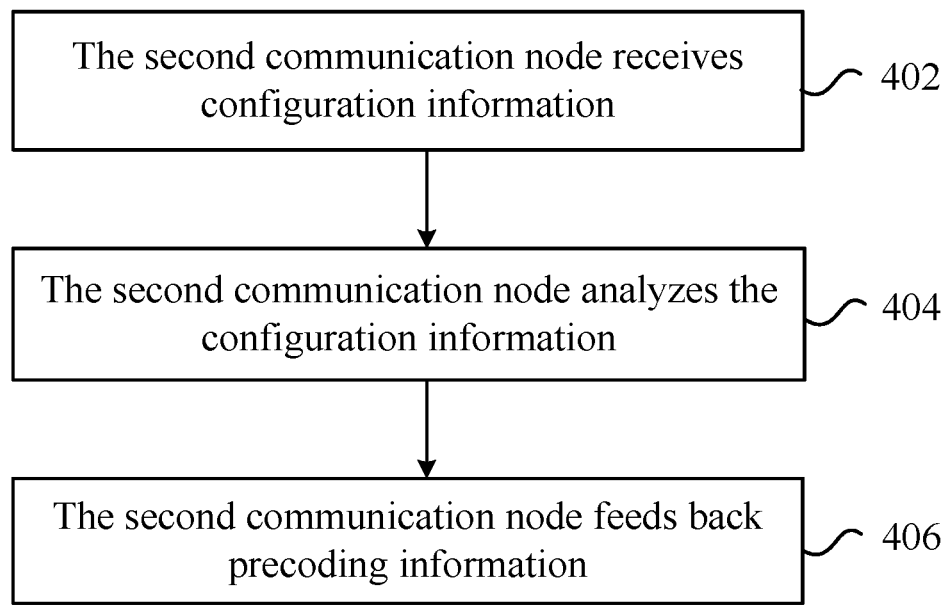
FIG. 4 is a flowchart of a method for determining precoding by a second communication node according to an embodiment of the present disclosure.

FIG. 4 is a flowchart of a method for determining precoding by a second communication node according to an embodiment of the present disclosure. As shown in FIG. 4, the flowchart includes the steps described below.

In step 402, the second communication node receives configuration information.

In step 404, the second communication node analyzes the configuration information.

In step 406: the second communication node feeds back precoding information.

Using the above technical solution, compared with the related art, it is possible to measure the precoding in the following cases: any combination of a number of antenna ports of the reference signal transmitted on a single resource and a number of antenna ports actually used.

From the description of the embodiments described above, it may be understood clearly by those skilled in the art that the method of any embodiment described above may be implemented by means of software plus a general-purpose hardware platform, or may be implemented by hardware. Based on this understanding, the technical solution of the present disclosure substantially, or the part contributing to the related art, may be embodied in the form of a software product. The computer software product is stored in a storage medium (such as a read-only memory (ROM)/random access memory (RAM), a magnetic disk or an optical disk) and includes several instructions for enabling a terminal device (which may be a mobile phone, a computer, a server, a network device or the like) to execute the method according to one or more embodiments of the present disclosure.

Embodiment Three

This embodiment further provides a device for determining precoding. The device is used for implementing the above embodiments and preferred embodiments. What has been described will not be repeated. As used below, the term "module" may be software, hardware or a combination thereof capable of implementing predetermined functions. The device in the embodiment described below is preferably implemented by software, but implementation by hardware or by a combination of software and hardware is also possible and conceivable.

Figure 5:
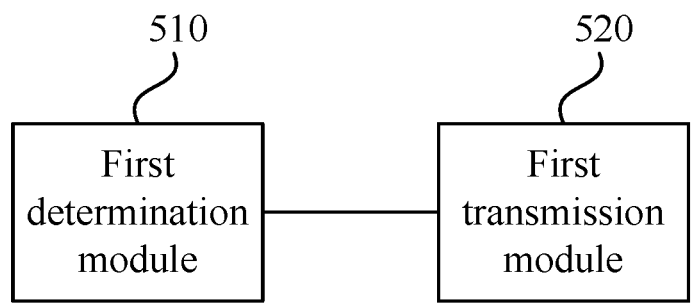
FIG. 5 is a structural diagram of a device for determining precoding according to an embodiment of the present disclosure.

According to an embodiment of the present disclosure, a device for determining precoding is further provided. As shown is FIG. 5, the device includes: a first determination module and a a first transmission module.

The first determination module 510 is configured to configure configuration information for a second communication node.

The first transmission module 520 is configured to transmit the configuration information to the second communication node, where the configuration information includes: first configuration information and second configuration information.

The first configuration information includes information of M or more resources and is used for instructing the second communication node to receive, on the M or more resources, a reference signal sent by the first transmission module 520.

The second configuration information is used for indicating a manner in which the second communication node acquires the precoding based on combined measurement results of the M or more resources.

M is an integer greater than 1, and the M or more resources are located in a same resource setting.

In an embodiment, the second configuration information includes first signaling. The first signaling is used for indicating a measurement mode for the second communication node to acquire the precoding. The measurement mode includes performing a combined measurement of the M or more resources to acquire the precoding. In an embodiment, the first signaling is not actually related to transmissions of the first configuration information and the second configuration information, and the first signaling may not be transmitted at the same time as the first configuration information and the second configuration information.

In an embodiment, the second configuration information includes second signaling. The second signaling is used for indicating at least one of: in a case where the second communication node feeds back the precoding, a number of resources to be measured; or in a case where the second communication node feeds back the precoding, index numbers of the resources to be measured. In an embodiment, the second communication node performs measurement according to the number of resources described above and/or measures resources with the above index numbers to determine the precoding, and feeds back the precoding.

In an embodiment, the second communication node is further used for instructing the second communication node to measure a first resource to acquire first dimension precoding information and measure a second resource to acquire second dimension precoding information in a case where the precoding includes the first dimension precoding information and the second dimension precoding information. In an embodiment, the first resource and the second resource are not actually limited, and may be different resources in the M or more resources.

In an embodiment, the second configuration information is further used for: instructing the second communication node to determine the measurement mode for measuring the precoding according to a relationship between a number of ports of the resources indicated by the first configuration information and a number of ports in a feedback report specified in the second configuration information; where the measurement mode includes: measuring a first resource to acquire first dimension precoding information of the precoding, and measuring a second resource to acquire second dimension precoding information of the precoding; where the first resource and the second resource are resources in the M or more resources.

In an embodiment, the second configuration information is used for: instructing the second communication node to determine the measurement mode for measuring the precoding according to a relationship between a number of ports of the resources indicated by the first configuration information and a number of ports in a feedback report specified in the second configuration information; where the measurement mode includes: acquiring the precoding based on the combined measurement of the M or more resources to acquire the precoding.

In an embodiment, the second configuration information includes third signaling, the third signaling is used for indicating a measurement mode for the second communication node to measure the precoding; where the measurement mode includes: measuring a first resource to acquire first dimension precoding information of the precoding, and measuring a second resource to acquire second dimension precoding information of the precoding. In an embodiment, precoding information in one dimension refers to information about one parameter in the precoding. The first dimension precoding information and the second dimension precoding information do not have a practically limited meaning, and are intended to indicate the precoding information of the two dimensions.

In an embodiment, the second configuration information includes fourth signaling, and the fourth signaling is used for indicating to the second communication node that precoding to be fed back includes precoding information of multiple dimensions, and a correspondence relationship between precoding information of each dimension and a measured resource of the precoding information of the respective dimension.

In an embodiment, in a case of determining ports in a feedback report of the second communication node are divided into multiple groups, the second configuration information is further used for indicating a first measurement mode, and the first measurement mode includes: determining, by the second communication node, distinction precoding information between an n-th group of ports and a 0-th group of ports based on a joint measurement of an n-th resource and a 0-th resource; where the first communication node applies the precoding fed back by the second communication node to the ports in the feedback report; the distinction precoding information includes information about differences existing between precoding information of different port groups or ports; the 0-th resource includes a resource with a starting index number; a 0-th group of ports includes a starting port group; and n is a positive integer.

In an embodiment, dividing antenna ports of the first communication node into multiple groups may be specified in standard protocols. The associated port in the feedback report of the second communication node indicates that the first communication node may apply the precoding fed back by the second communication node to the ports indicated in the feedback report.

In an embodiment, the second configuration is also used for instructing the second communication node to determine distinction precoding information between a first part and a second part of the n-th group of ports based on the measurement of the n-th resource. The first part of ports and the second part of ports are arranged in an order of port numbers, the number of the first part of ports is the same as the number of the second part of ports, and a sum of the number of the first part of ports and the number of the second part of ports is a total number of ports included in the n-th group of ports.

In an embodiment, in a case of determining ports in a feedback report of the second communication node are divided into multiple groups, the second configuration information is also used for indicating a second measurement mode, the second measurement mode includes: determining, by the second communication node, distinction precoding information between an n-th group of ports and a 0-th group of ports based on a measurement of an n-th resource; where the first communication node applies the precoding fed back by the second communication node to the ports in the feedback report; the distinction precoding information includes information about differences existing between precoding information of different port groups or ports; a 0-th resource is a resource with a starting index number; the 0-th group of ports is a starting port group; and n is a positive integer.

In an embodiment, after the second communication node determines the distinction precoding information between the n-th group of ports and the 0-th group of ports, the second communication node reports the precoding information of the 0-th group of ports, and the distinction precoding information between other groups of ports and the 0-th group of ports.

In an embodiment, in a case of determining ports in a feedback report of the second communication node are divided into multiple groups, the second configuration information is further used for indicating a third measurement mode, the third measurement mode is used for indicating the second communication node at least one of: acquiring distinction precoding information between port groups by measuring a resource; or acquiring distinction precoding information between multiple ports in the port group by measuring another resource. In an embodiment, the distinction precoding information between port groups refers to the distinction precoding information between other groups of ports and the 0-th group of ports.

In an embodiment, the second configuration information includes fifth signaling. The fifth signaling is used for indicating a measurement mode for the second communication node to measure the distinction precoding information between an n-th group of ports and a 0-th group of ports; where the 0-th group of ports is a starting port group. In an embodiment, the measurement mode may include information on a first measurement mode, a second measurement mode or a third measurement mode and a fourth measurement mode, etc., mentioned in the embodiment.

In an embodiment, the second configuration information includes sixth signaling. The sixth signaling is used for indicating a fourth measurement mode for the second communication node to measure distinction precoding information between an n-th group of ports and a 0-th group of ports, the fourth measurement mode includes one of the following.

The distinction precoding information between the n-th group of ports and the 0-th group of ports is determined based on measurement of an n-th resource. For example, distinction precoding information between a first group of ports and the 0-th group of ports is obtained by measuring one resource, distinction precoding information between a second group of ports and the 0-th group of ports is obtained by measuring another resource, and distinction precoding information between a third group of ports and the 0-th group of ports is obtained by measuring yet another resource.

The distinction precoding information between the n-th group of ports and the 0-th group of ports is determined based on the measurement of a specified resource in the M or more resources. For example, the distinction precoding information between the first group of ports and the 0-th group of ports, the distinction precoding information between the second group of ports and the 0-th group of ports, and the distinction precoding information between the third group of ports and the 0-th group of ports are obtained by measuring a same resource, that is, the distinction precoding information between all port groups is obtained by measuring a same resource.

The 0-th group of ports is a starting port group, and n is a positive integer.

In an embodiment, in a case of determining ports in a feedback report of the second communication node are divided into multiple groups, the first communication node indicates in the first configuration information that the M or more resources are divided into two groups, one group of resources in the two group is used for calculating distinction precoding information between multiple groups of ports, the other group of resources in the two group is used for calculating distinction precoding information between different ports in a port group. The first communication node applies the precoding fed back by the second communication node to the ports in the feedback report; and the distinction precoding information includes information about differences existing between precoding information of different port groups or ports.

Figure 6:
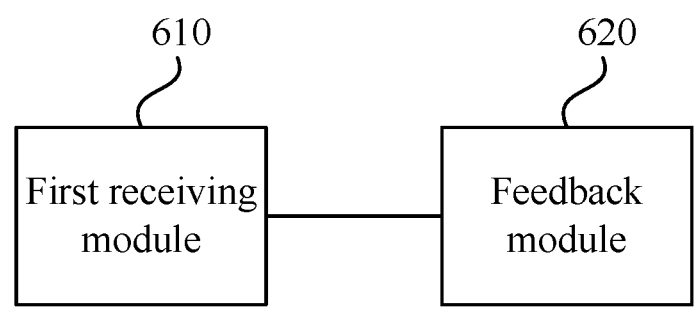
FIG. 6 is a structural diagram of another device for determining precoding according to an embodiment of the present disclosure.

According to another embodiment of the present disclosure, another device for determining precoding is further provided. As shown is FIG. 6, the device includes: a first receiving module and a feedback module.

The first receiving module 610 is configured to receive configuration information transmitted by a first communication node, wherein the configuration information includes first configuration information and second configuration information.

The feedback module 620 is configured to feed back the precoding to the first communication node according to the configuration information.

The first configuration information includes information of M or more resources for instructing the second communication node to receive, on the M or more resources, a reference signal sent by the first communication node.

The second configuration information is used for indicating a manner in which the feedback module 620 acquires the precoding based on combined measurement results of the M or more resources.

M is an integer greater than 1, and the M or more resources are located in a same resource setting.

In an embodiment, the step in which the second communication node feeds back the precoding to the first communication node according to the configuration information includes: in a case of determining ports in a feedback report of the second communication node are divided into multiple groups, determining, by the second communication node according to the configuration information, precoding of a 0-th group of ports and distinction precoding information between each group of other groups of ports and the 0-th group of ports; feeding back, by the second communication node, the precoding of the 0-th group of ports, and the distinction precoding information to the first communication node; where the distinction precoding information includes information about differences existing between precoding information of different port groups or ports, and the 0-th group of ports includes a starting port group.

Generally, the precoding information of the 0-th group of ports is obtained based on measurement of a specified resource.

One or more modules described above may be implemented by software or hardware. Implementation by hardware may, but may not necessarily, be performed in the following manner: the one or more modules described above are located in a same processor or multiple modules described above are located in their respective processors in any combination form.

Embodiment Four

According to another embodiment of the present disclosure, a storage medium is further provided. The storage medium is configured to store computer programs, where the computer programs, when are executed, perform the method described in any embodiment described above.

Embodiment Five

Figure 7:
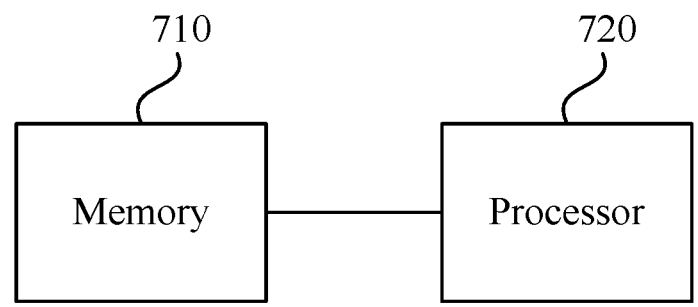
FIG. 7 is a structural diagram of an electronic device according to an embodiment of the present disclosure.

According to another embodiment of the present disclosure, an electronic device is further provided. As shown in FIG. 7, the electronic device includes a memory 710 and a processor 720. The memory 710 is configured to store computer programs, and the processor 720 is configured to execute the computer programs for performing the method described in any embodiment described above.

Apparently, those skilled in the art should understand that various modules or steps described above of the present disclosure may be implemented by a general-purpose computing apparatus, the various modules or steps may be concentrated on a single computing apparatus or distributed on a network composed of multiple computing apparatuses. In an embodiment, the various modules or steps may be implemented by program codes executable by the computing apparatus, so that the modules or steps may be stored in a storage apparatus for execution by the computing apparatus, and in some circumstances, the illustrated or described steps may be performed in sequences different from those described herein, or the module or steps may be made into various integrated circuit modules separately, or multiple modules or steps therein may be made into a single integrated circuit module for implementation. The present disclosure is not limited to any specific combination of hardware and software.

What is claimed is:

1. A method for determining precoding, comprising:
configuring, by a first communication node, configuration information for a second communication node; and
transmitting, by the first communication node, the configuration information to the second communication node, wherein the configuration information comprises: first configuration information and second configuration information;

wherein the first configuration information comprises information of M or more resources, and the first configuration information is used for instructing the second communication node to receive, on the M or more resources, a reference signal sent by the first communication node;

the second configuration information is used for indicating a manner in which the second communication node acquires the precoding based on combined measurement results of the M or more resources; and M is an integer greater than 1, and the M or more resources are located in a same resource setting.

2. The method of claim 1, wherein the second configuration information comprises first signaling, and the first signaling is used for indicating a measurement mode for the second communication node to acquire the precoding; and wherein the measurement mode comprises: performing a combined measurement of the M or more resources to acquire the precoding.

3. The method of claim 1, wherein the second configuration information comprises second signaling, and the second signaling is used for indicating at least one of:

in a case where the second communication node feeds back the precoding, a number of resources to be measured; or in a case where the second communication node feeds back the precoding, index numbers of the resources to be measured.

4. The method of claim 1, wherein the second configuration information is further used for:

instructing the second communication node to measure a first resource to acquire first dimension precoding information and measure a second resource to acquire second dimension precoding information in a case where the precoding comprises the first dimension precoding information and the second dimension precoding information;

wherein the first resource and the second resource are resources in the M or more resources.

5. The method of claim 1, wherein the second configuration information is further used for:

instructing the second communication node to determine the measurement mode for measuring the precoding according to a relationship between a number of ports of the resources indicated by the first configuration information and a number of ports in a feedback report specified in the second configuration information;

wherein the measurement mode comprises: measuring a first resource to acquire first dimension precoding information of the precoding, and measuring a second resource to acquire second dimension precoding information of the precoding;

wherein the first resource and the second resource are resources in the M or more resources.

6. The method of claim 1, wherein the second configuration information is further used for:

instructing the second communication node to determine the measurement mode for measuring the precoding according to a relationship between a number of ports of the resources indicated by the first configuration information and a number of ports in a feedback report specified in the second configuration information;

wherein the measurement mode comprises: acquiring the precoding based on a combined measurement of the M or more resources.

7. The method of claim 1, wherein the second configuration information comprises third signaling, and the third signaling is used for indicating a measurement mode for the second communication node to acquire the precoding;

wherein the measurement mode comprises: measuring a first resource to acquire first dimension precoding information of the precoding, and measuring a second resource to acquire second dimension precoding information of the precoding;

wherein the first resource and the second resource are resources in the M or more resources.

8. The method of claim 1, wherein the second configuration information comprises fourth signaling, and the fourth signaling is used for indicating to the second communication node that precoding to be fed back comprises precoding information of a plurality of dimensions, and a correspondence relationship between precoding information of each dimension and a measured resource of the precoding information of the respective dimension.

9. The method of claim 1, wherein in a case of determining that ports in a feedback report of the second communication node are divided into a plurality of groups, the second configuration information is further used for indicating a first measurement mode, and the first measurement mode comprises:

determining, by the second communication node, distinction precoding information between an n-th group of ports and a 0-th group of ports based on a joint measurement of an n-th resource and a 0-th resource;

wherein the first communication node applies the precoding fed back by the second communication node to the ports in the feedback report; the distinction precoding information comprises information about differences existing between precoding information of different port groups or ports; the 0-th resource comprises a resource with a starting index number; a 0-th group of ports comprises a starting port group; and n is a positive integer.

10. The method of claim 9, wherein the second configuration information is further used for instructing the second communication node, based on the measurement of the n-th resource, to determine the distinction precoding information between a first part of ports and a second part of ports which belong to the n-th group of ports; wherein the first part of ports and the second part of ports are arranged according to an order of port numbers, a number of the first part of ports is same as a number of the second part of ports, and a sum of the number of the first part of ports and the number of the second part of ports is a total number of ports comprised in the n-th group of ports.

11. The method of claim 1, wherein in a case of determining that ports in a feedback report of the second communication node are divided into a plurality of groups, the second configuration information is further used for indicating a second measurement mode, and the second measurement mode comprises: determining, by the second communication node, distinction precoding information between an n-th group of ports and a 0-th group of ports based on a measurement of an n-th resource;

wherein the first communication node applies the precoding fed back by the second communication node to the ports in the feedback report; the distinction precoding information comprises information about differences existing between precoding information of different port groups or ports; a 0-th resource is a resource with a starting index number; the 0-th group of ports is a starting port group; and n is a positive integer.

12. The method of claim 1, wherein in a case of determining that ports in a feedback report of the second communication node are divided into a plurality of groups, the second configuration information is further used for indicating a third measurement mode, and the third measurement mode is used for indicating, to the second communication node, at least one of:
   acquiring distinction precoding information between different port groups by measuring a third resource;
   acquiring distinction precoding information between a plurality of ports in a port group by measuring a fourth resource;
   wherein the first communication node applies the precoding fed back by the second communication node to the ports in the feedback report; the distinction precoding information comprises information about differences existing between precoding information of different port groups or ports; and the third resource and the fourth resource are different resources in the M or more resources.

13. The method of claim 1, wherein the second configuration information comprises fifth signaling, and the fifth signaling is used for indicating a measurement mode for the second communication node to measure distinction precoding information between an n-th group of ports and a 0-th group of ports;
   wherein the 0-th group of ports is a starting port group, and n is a positive integer.

14. The method of claim 1, wherein the second configuration information comprises sixth signaling, the sixth signaling is used for indicating a fourth measurement mode for the second communication node to measure distinction precoding information between an n-th group of ports and a 0-th group of ports, and the fourth measurement mode comprises one of:
   determining the distinction precoding information between the n-th group of ports and the 0-th group of ports based on measurement of an n-th resource; or
   determining the distinction precoding information between the n-th group of ports and the 0-th group of ports based on a measurement of a designated resource in the M or more resources;
   wherein the 0-th group of ports is a starting port group, and n is a positive integer.

15. The method of claim 1, wherein in a case of determining that ports in a feedback report of the second communication node are divided into a plurality of groups, the first communication node indicates in the first configuration information that the M or more resources are divided into two groups, one group of resources in the two group is used for calculating distinction precoding information between a plurality of groups of ports, the other group of resources in the two group is used for calculating distinction precoding information between different ports in a port group;
   wherein the first communication node applies the precoding fed back by the second communication node to the ports in the feedback report; and the distinction precoding information comprises information about differences existing between precoding information of different port groups or ports.

16. A method for determining precoding, comprising:
   receiving, by a second communication node, configuration information transmitted by a first communication node, wherein the configuration information comprises first configuration information and second configuration information; and
   feeding back, by the second communication node, the precoding to the first communication node according to the configuration information;
   wherein the first configuration information comprises information of M or more resources for instructing the second communication node to receive, on the M or more resources, a reference signal sent by the first communication node;
   the second configuration information is used for indicating a manner in which the second communication node acquires the precoding based on combined measurement results of the M or more resources; and
   M is an integer greater than 1, and the M or more resources are located in a same resource setting.

17. The method of claim 16, wherein the feeding back, by the second communication node, the precoding to the first communication node according to the configuration information comprises:
   in a case of determining that ports in a feedback report of the second communication node are divided into a plurality of groups, determining, by the second communication node according to the configuration information, precoding of a 0-th group of ports and distinction precoding information between each group of other groups of ports and the 0-th group of ports; and
   feeding back, by the second communication node, the precoding of the 0-th group of ports and the distinction precoding information to the first communication node;
   wherein the distinction precoding information comprises information about differences existing between precoding information of different port groups or ports, and the 0-th group of ports comprises a starting port group.

18. A device for determining precoding, comprising: a processor and a memory; wherein the memory is configured to store computer programs, and the processor is configured to execute the computer programs; and wherein the computer programs comprise:
   a first determination module, configured to configure configuration information for a second communication node; and
   a first transmission module, configured to transmit the configuration information to the second communication node, wherein the configuration information comprises: first configuration information and second configuration information;
   wherein the first configuration information comprises information of M or more resources, and the first configuration information is used for instructing the second communication node to receive, on the M or more resources, a reference signal sent by the first transmission module;
   the second configuration information is used for indicating a manner in which the second communication node acquires the precoding based on combined measurement results of the M or more resources; and
   M is an integer greater than 1, and the M or more resources are located in a same resource setting.

19. A device for determining precoding for performing the method of claim 16, comprising: a processor and a memory; wherein the memory is configured to store computer programs, and the processor is configured to execute the computer programs; and
   wherein the computer programs comprise:
   a first receiving module, configured to receive configuration information transmitted by a first communication node, wherein the configuration information comprises first configuration information and second configuration information; and a feedback module, configured to feed back the precoding to the first communication node according to the configuration information;

wherein the first configuration information comprises information of M or more resources, and the first configuration information is used for instructing the second communication node to receive, on the M or more resources, a reference signal sent by the first communication node;

the second configuration information is used for indicating a manner in which the feedback module acquires the precoding based on combined measurement results of the M or more resources; and M is an integer greater than 1, and the M or more resources are located in a same resource setting.

20. A non-transitory storage medium, configured to store computer programs, wherein the computer programs, when executed, perform the method of claim 1.

* * * * *